United States Patent Office.

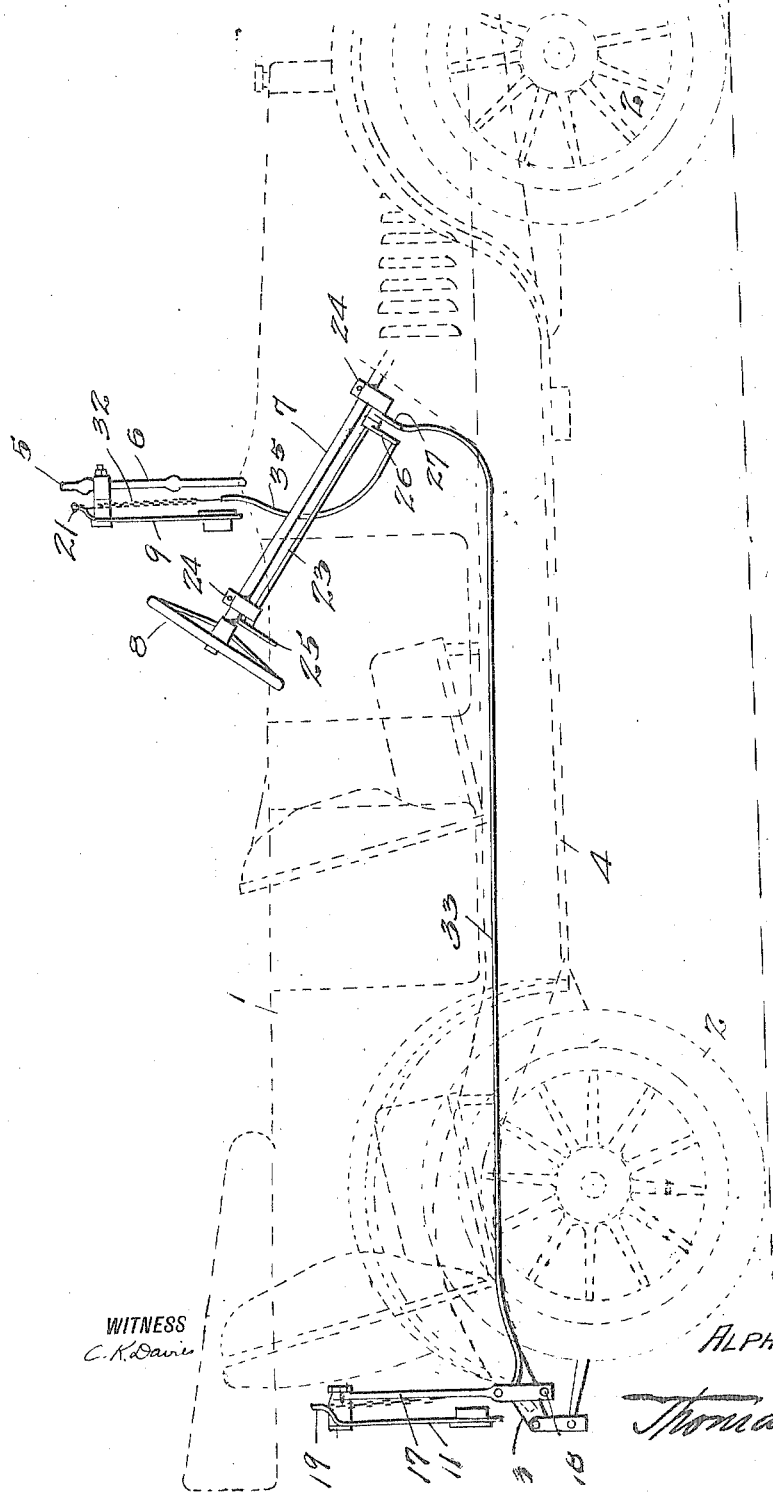

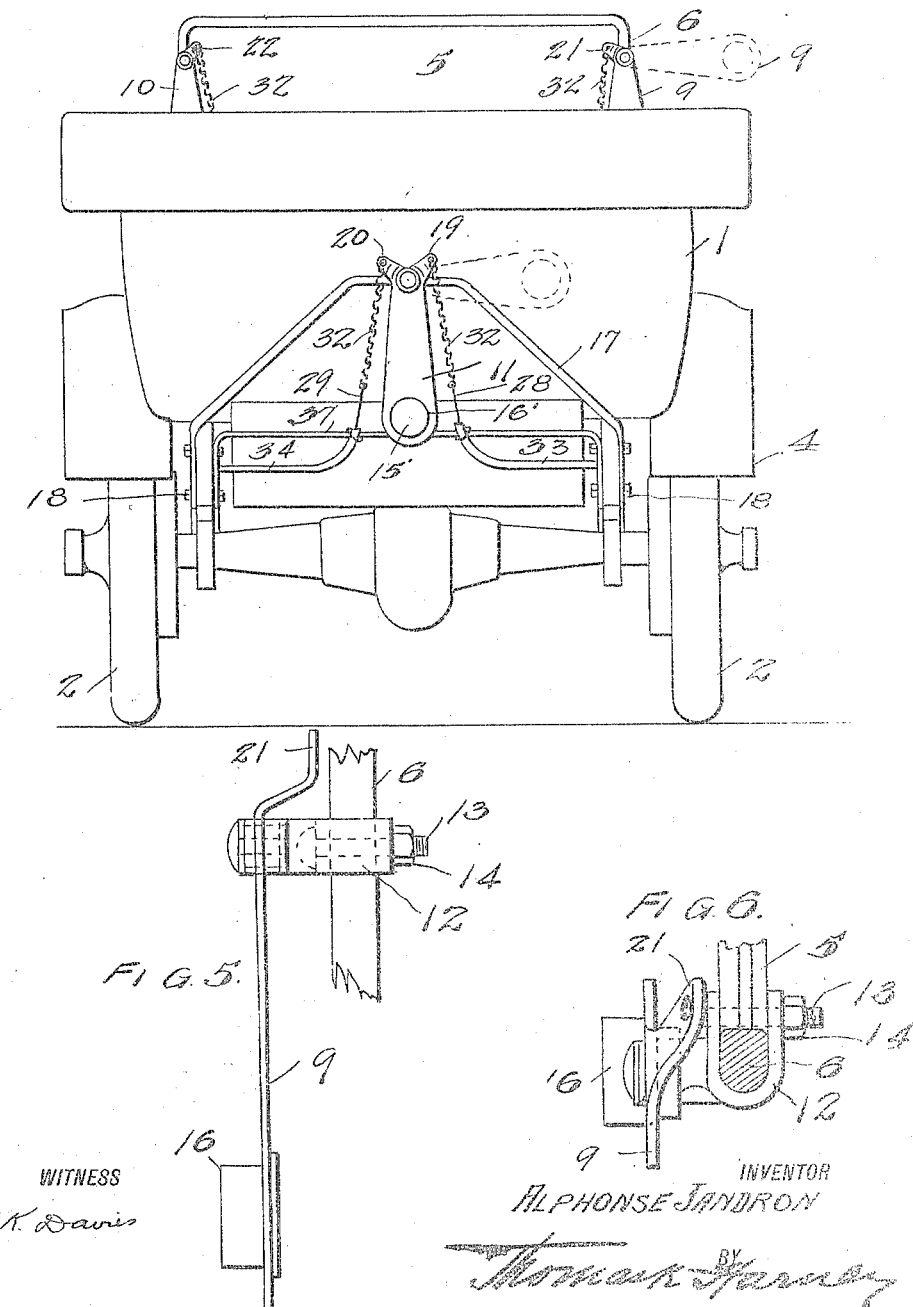

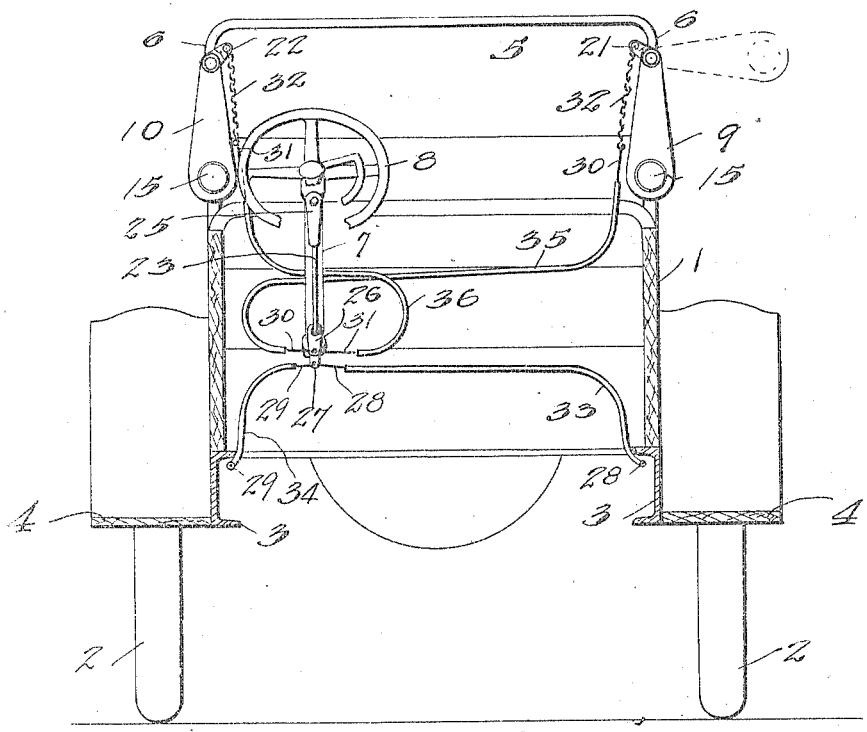
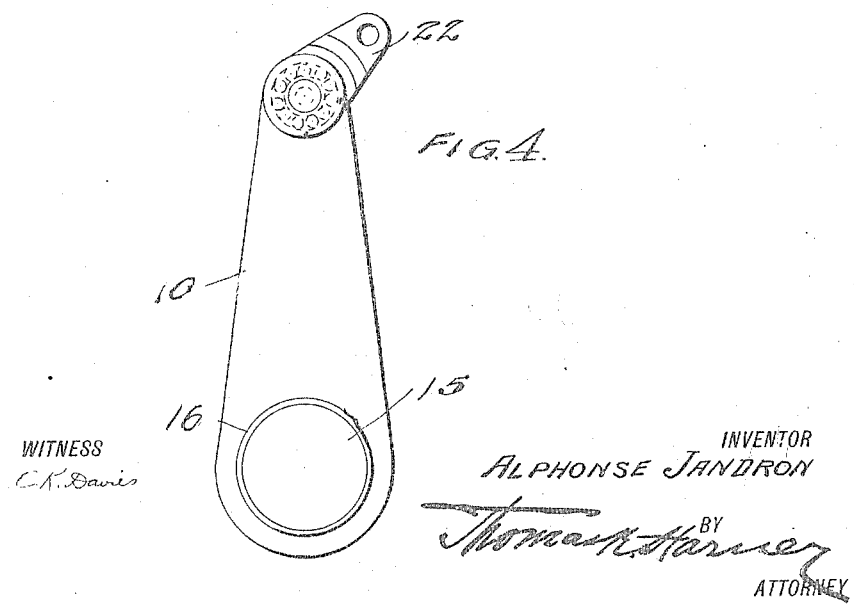

ALPHONSE JANDRON, OF MARQUETTE, MICHIGAN.

AUTOMOBILE-SIGNAL.

1,273,230.  Specification of Letters Patent.  Patented July 23, 1918.

Application filed August 23, 1917.  Serial No. 187,788.

*To all whom it may concern:*

Be it known that I, ALPHONSE JANDRON, a citizen of the United States of America, residing at Marquette, in the county of Marquette and State of Michigan, have invented certain new and useful Improvements in Automobile-Signals, of which the following is a specification.

The present invention relates to improvements in automobile signals of the visual or visible type, and is designed to provide a combination forward or front, and rear signal for such vehicles, whereby the signals may be actuated to indicate the direction of travel to pedestrians and others in front of a traveling car, as well as to the following vehicles in the rear of the car.

The invention consists in certain novel combinations and arrangements of parts as hereinafter set forth and claimed.

In the accompanying drawings I have illustrated one complete example of the physical embodiment of my invention, constructed and arranged according to the best mode I have so far devised for the practical application of the principles of my invention.

Figure 1 is a side elevation, in dotted lines of a standard type of automobile, showing some parts in full, with my invention installed therein.

Fig. 2 is a rear end view of the vehicle of Fig. 1.

Fig. 3 is a sectional, transverse view of the automobile, looking toward the front and showing the two front signal arms or semaphores.

Fig. 4 is an enlarged view of one of the front signal arms.

Fig. 5 is an edge view of the arm of Fig. 4.

Fig. 6 is a top plan view of Fig. 5 showing a part of the windshield bar or frame in section.

In order to facilitate the understanding of my invention I have illustrated a standard type of automobile showing the body 1, its wheels 2, 2, and the side channel beams or bars 3, 3, of the chassis upon which the body is supported. The usual side boards or running boards 4 are exemplified, and at the front of the machine the windshield 5 with its side post or bar 6 is utilized, as well as the steering post 7 of the wheel 8.

In the equipment of an automobile with my signaling device, I employ two front signal arms as the left at 9, and the right signal arms as the left at 9, and the right at 10, and one signal arm 11 at the rear adapted to serve for the purpose of indicating either a turn to the right or a turn to the left. To accomplish this result, the right hand front signal arm is turned to the indicating position simultaneously with a swinging movement to the right of the rear arm, and the left hand signal arm is swung upward to indicating position, which is horizontal, as indicated in dotted lines, when the rear signal arm is simultaneously swung to the left.

As best seen in Figs. 4, 5, and 6, the two front signal arms are supported on ball bearings (see dotted lines Fig. 4) so that they will swing from the vertical to the horizontal position, and the arms are operatively suspended from the windshield side bars 6, 6, by means of a clamp bracket 12 fastened to the bar by the clamp bolt 13 and nut 14. The long arm of the signal semaphore may have a colored glass 15 and an electric lamp bracket 16 to be used after dark, and the electric lamps may be supplied with current through wires arranged as hereinafter mentioned.

The rear signal arm 11 is centrally located of the car, and is pivoted to swing either up to the right or up to the left to horizontal position, as shown in dotted lines Fig. 2. A bracket in arched form is indicated at 17, which is a metallic bar extending transversely of the car at the rear and attached as by bolts or screws 18 to the side bars of the chassis. This signal arm also has the colored glass plate 15' and lamp bracket or box 16' so that it may be useful after dark. The rear signal arm has a pair of short lever arms 19 and 20 projecting at angles of 45 degrees from the center of rotary movement of the signal arm, to the right and left respectively. These arms are connected to similar arms 21 and 22 of the respective signal arms 9 and 10, there being operating instrumentalities interposed between the front and rear signal arms.

For operating the signal arms I utilize a rocker bar or rod 23 located adjacent and parallel with the steering rod and supported therefrom by a pair of clamped brackets 24, 24, and this rod is provided with a lever 25 situated just beneath the steering wheel where it is accessible for facile use by the driver of the car. At the lower end of the rod a pair of lever arms as 26 and 27 are fixed to the rod, the lower arm 27 being designed to operate the rear signal arm through the two wires 28 and 29 at the right and left respectively, and the upper lever arm being designed to operate the two front signal arms 9 and 10 by means of the wires 30 and 31. At their ends adjoining the signal arms, the wires are provided each with an attaching chain 32 connected to the short end of the signal arm, and the wires are passed through flexible tubing as 33 and 34 at the front of the car from the lever arm 26 to the wind shield, and by similar tubing 35 and 36 extending from the front along the sides of the car to the rear where they are supported by means of the cross brace 37 bolted to the side bars of the frame of the car.

The electric wires for illuminating the signal arms may be carried through these wire tubes and connected to the signal arms in suitable manner.

In Fig. 3 the peculiar and special arrangement of the front wire tubes will be noticed, the tubing for the operating wire of the right hand signal crossing over beyond the rocker rod and attached at the left of the rocker arm 26, and the wire from the left hand arm passes through tubing which crosses over to the right beyond the rocker arm 26 and is attached thereto at the right side. Thus it will be seen that the operating lever is turned in the direction to be indicated, and in Fig. 2 (dotted lines) it will be seen that the lever has been swung to the right thus swinging the right front arm and the rear arm to the right.

Having thus fully described the invention what I claim is:

The combination with an automobile including its frame, wind shield, and rear axle casing, of a signal arm pivoted at each end of the wind shield, a supporting frame fixed to the rear axle casing and a single rear arm pivoted on said supporting frame and provided with a pair of short lever arms, wires forming connections between the rear lever arms and the front signal arms; the steering post, an operating lever pivoted thereon, a rock bar, and lever arms on said bar connected with said wires, whereby the rear pivoted arm may be swung in unison with a selected one of the front arms.

In testimony whereof I affix my signature.

ALPHONSE JANDRON.